(12) United States Patent
Montez

(10) Patent No.: US 7,237,786 B2
(45) Date of Patent: Jul. 3, 2007

(54) ROWING BICYCLE

(75) Inventor: Douglas R. Montez, 11845 SE. 92nd Ter., Belleview, FL (US) 34420

(73) Assignees: Taz's Custom Welding, Inc., Hartville, MO (US); Douglas R. Montez, Hartville, MO (US)

( * ) Notice: Subject to any disclaimer, the term of this patent is extended or adjusted under 35 U.S.C. 154(b) by 0 days.

(21) Appl. No.: 10/921,445

(22) Filed: Aug. 19, 2004

(65) Prior Publication Data

US 2006/0038374 A1   Feb. 23, 2006

(51) Int. Cl.
*B62K 21/00* (2006.01)

(52) U.S. Cl. .................. 280/240; 280/244; 280/282

(58) Field of Classification Search ................ 280/240, 280/242.1, 243, 244, 245, 246, 250, 253, 280/282
See application file for complete search history.

(56) References Cited

U.S. PATENT DOCUMENTS

| 413,104 | A | | 10/1889 | Saxton | |
|---|---|---|---|---|---|
| 534,537 | A | | 2/1895 | Williams | |
| 2,147,732 | A | | 2/1939 | Boynton | |
| 3,913,945 | A | | 10/1975 | Clark | |
| 4,632,414 | A | * | 12/1986 | Ellefson | ..................... 280/246 |
| 4,700,962 | A | | 10/1987 | Salmon | |
| 4,796,907 | A | | 1/1989 | Geller | |
| D304,319 | S | | 10/1989 | Brummer | |
| 4,886,287 | A | * | 12/1989 | Krause, II et al. | .......... 280/246 |
| 4,925,200 | A | | 5/1990 | Jones | |
| 5,039,120 | A | | 8/1991 | Stowe | |
| 5,209,506 | A | * | 5/1993 | Klopfenstein | ................ 280/240 |
| 5,280,936 | A | * | 1/1994 | Schmidlin | .................... 280/234 |
| 5,762,350 | A | * | 6/1998 | Jolly | ........................... 280/245 |
| 6,378,882 | B1 | * | 4/2002 | Devine | ....................... 280/234 |

FOREIGN PATENT DOCUMENTS

FR           2424178          4/1978

* cited by examiner

*Primary Examiner*—Kevin Hurley

(57) ABSTRACT

A rowing bicycle comprised of a frame (1), a steering unit (55), a powering unit (56) having a dual motion gear (23), wheels (2) and (3) and a seat (5). The frame (1) is designed so as to have the user sit in a position where his or her legs are almost horizontally straight. The steering unit (55) pivots left and right about a center bar (19) located in between the frame (1) to allow a user to turn the bicycle while the dual motion gear (23) allows the user to power the bicycle both when pushing the steering unit (55) forward and when pulling the steering unit (55) back.

17 Claims, 6 Drawing Sheets

ROWING BICYCLE

BACKGROUND OF THE INVENTION

This invention relates to rowing bicycles, more particularly, a rowing bicycle that is powered both on a pull and push stroke and can be maneuvered by pivotal steering.

There are many bicycles that are currently used by handicapped persons for work and play. However, these bicycles have several significant drawbacks. First, the bicycles are powered on a pull stroke only, meaning that the bicycle is propelled forward only when the user pulls the handlebar toward himself or herself. Thus, although no significant force is exerted by the user on the push stroke, the bicycle is not being propelled forward as well. Thus, a user is simply wasting his or her energy during the return.

Additionally, current rowing bicycles are limited in steering capabilities. Similar to the steering of a traditional bicycle, a rowing bicycle user turns the handlebars simply by pushing one side of the handlebar forward. However, to steer a rowing bicycle by such a means may be difficult for some users, especially if they have wrist, arm or shoulder problems.

Thus, the need exists for a rowing bicycle which provides power on both a pull and push stroke and can be steered in a non-traditional manner.

The relevant prior art includes the following patents:

| Pat. No. (U.S. unless stated otherwise) | Inventor | Issue Date |
|---|---|---|
| 2,147,732 | Boynton | Feb. 21, 1939 |
| 5,039,120 | Stowe | Aug. 13, 1991 |
| Des. 304,319 | Brummer | Oct. 31, 1989 |
| 4,796,907 | Geller | Jan. 10, 1989 |
| 413,104 | Saxton | Oct. 15, 1889 |
| FR 2,424,178 | Chatillon | Apr. 25, 1978 |
| 4,632,414 | Ellefson | Dec. 30, 1986 |
| 534,537 | Williams | Feb. 19, 1895 |
| 4,700,962 | Salmon | Oct. 20, 1987 |
| 4,886,287 | Krause, II et al. | Dec. 12, 1989 |
| 4,925,200 | Jones | May 15, 1990 |
| 3,193,945 | Clark | Oct. 21, 1975 |

Although the above patents teach various types of bicycles, none teach a rowing bicycle that is powered on both a pull and push stroke and has pivotal steering.

SUMMARY OF THE INVENTION

The primary object of the present invention is to rowing bicycle that is powered on both a pull and push stroke.

A further object of the present invention is to provide a rowing bicycle that can be steered pivotally.

An even further object of the present invention is to provide a rowing bicycle that has a dual motion gear.

A further object of the present invention is to provide a rowing bicycle that has a plurality of gear speeds.

An even further object of the present invention is to provide a rowing bicycle that is easy to use by paraplegics.

The present invention fulfills the above and other objects by providing a rowing bicycle comprised of a frame, a steering unit, a powering unit having a dual motion gear, wheels and a seat. The frame is designed so as to have the user sit in a position where his or her legs are almost horizontally straight. The steering unit pivots left and right about a center bar located in between the frame to allow a user to turn the bicycle. The dual motion gear allows the user to power the bicycle both when pushing the steering unit forward and when pulling the steering unit back.

To use the present invention, a user positions himself or herself on the rowing bicycle by sitting on the seat and extending his or her legs out so his or her feet rest on a front crossbar. Then, the user grasps the hand grips of the handlebar and pushes the steering unit away from his or her body. At this time, the dual motion gear will provide power to the rear wheel and cause the rowing bicycle to start moving. Then, the user pulls the steering unit toward his or her body. Because of the dual motion gear, the pulling action will also provide power to the rear wheel and cause the rowing bicycle to move forward. To turn the direction of movement, a user pivots the steering unit left or right about the center bar.

Additionally, the user can switch gears on the rowing bicycle to make the bicycle go faster or use the handbrake to cause the bicycle to stop.

The use of the present invention will allow paraplegics, as well as others desiring a workout or enjoyment from using a rowing bicycle, to travel faster.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
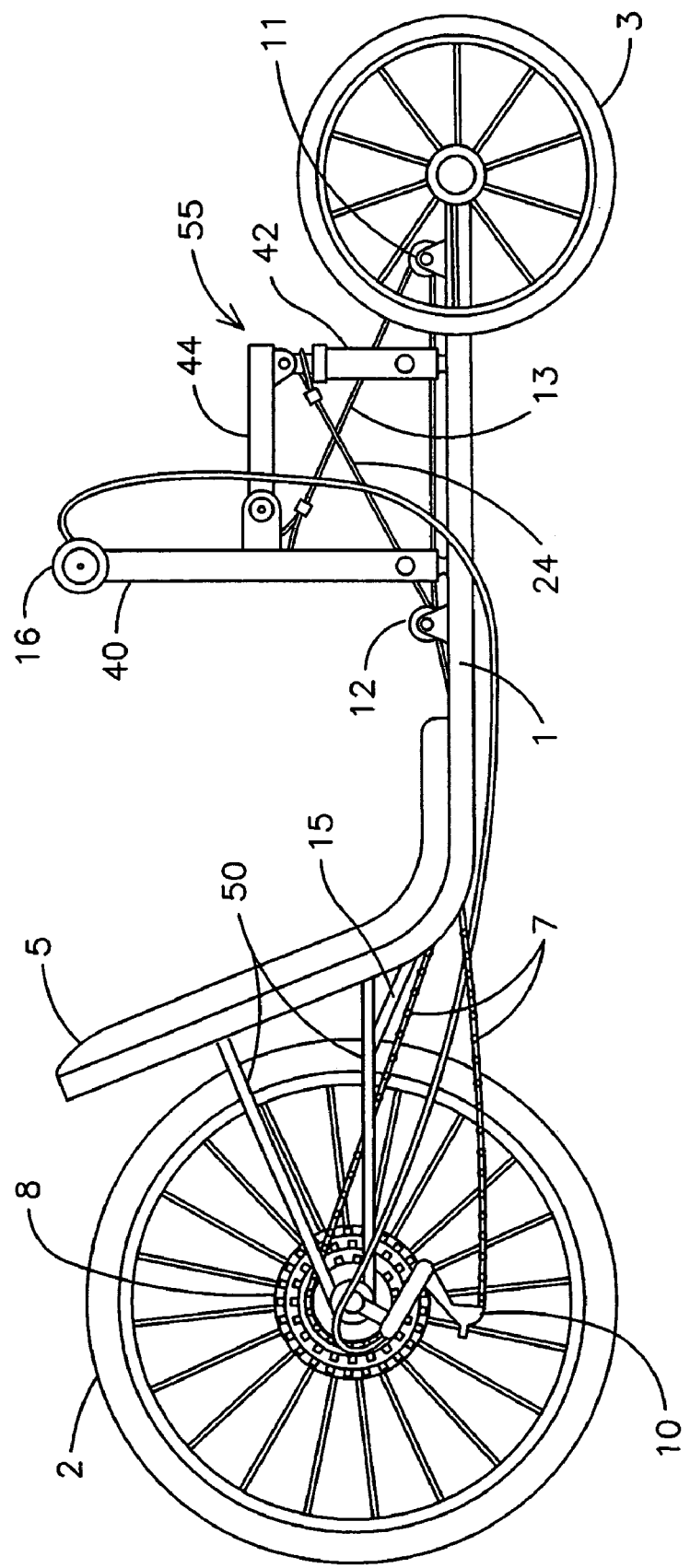
FIG. 1 is a side view of the rowing bicycle of the present invention.
Figure 2:
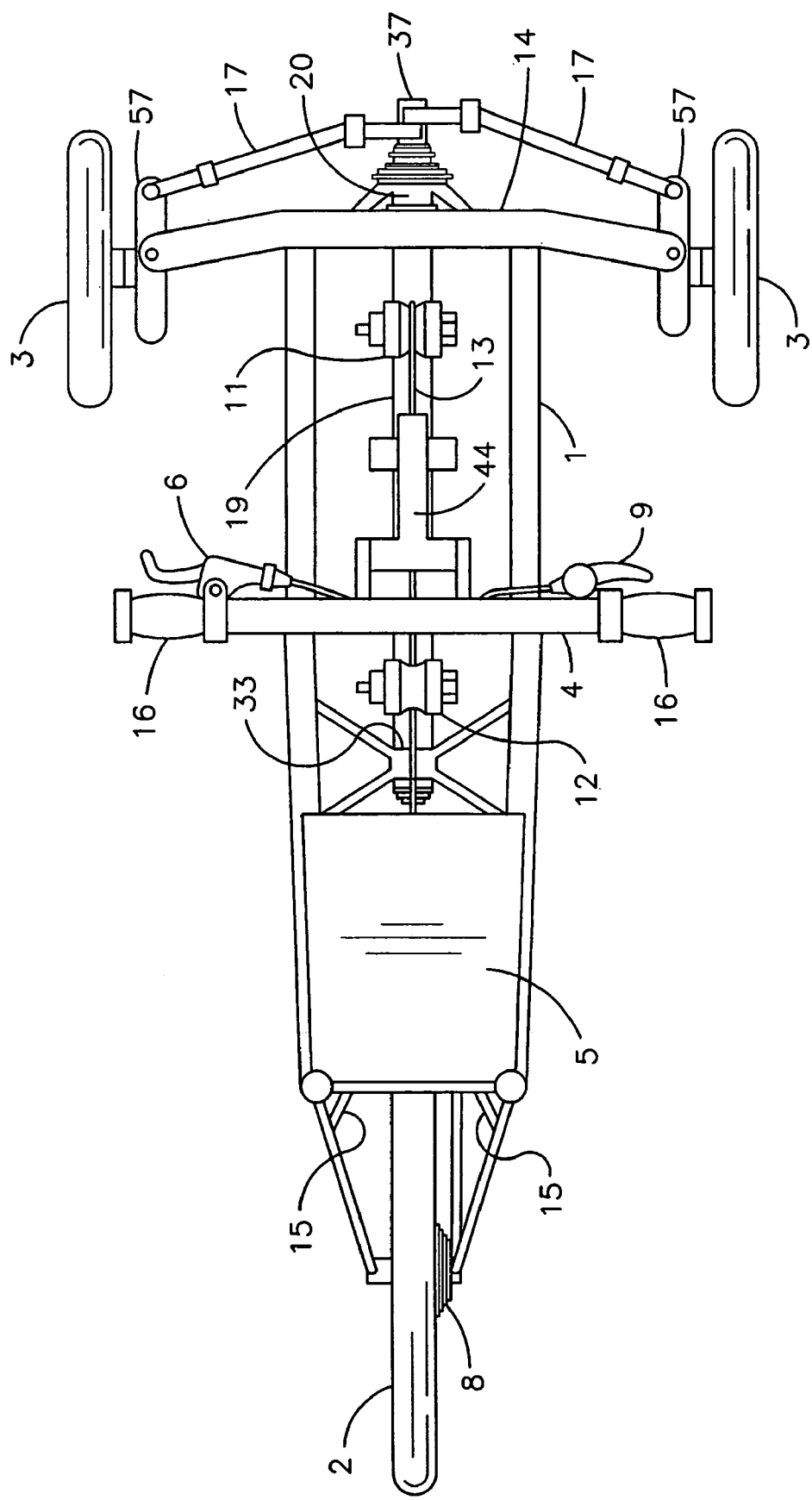
FIG. 2 is a top view of the embodiment of FIG. 1.

For purposes of describing the preferred embodiment, the terminology used in reference to the numbered components in the drawings is as follows:

1. frame
2. rear wheel
3. front wheel
4. handlebar
5. seat
6. handbrake
7. rear wheel chain
8. gear plates
9. gear shifter
10. gear shifting mechanism
11. first pulley
12. second pulley 13. reverse chain cable
14. front crossbar
15. rear support bar
16. hand grip
17. turning arm
18. insertable end
19. center bar
20. front end of center bar
21. forward chain
22. reverse chain
23. dual motion gear
24. forward chain cable
25. connecting tube
26. bolts
27. rod
28. threaded rod
29. first center bar T
30. screw
31. center bar front end supports
32. center bar back end supports
33. back end of center bar
34. washer
35. end cap
36. second center bar T
37. center bar tab
38. plates
39. gear cable
40. rowing vertical bar
41. small pipe
42. rowing leg
43. rowing tab
44. rowing T-pipe
45. clip
46. spacer
47. nut
48. x-bar support
49. seat frame
50. rear wheel frame
51. sprocket
52. reverse chain gear
53. forward chain gear
54. rear wheel chain gear
55. steering unit
56. powering unit
57. front crossbar tab
58. connecting tube anchor
59. housing sides
60. cover
61. head With reference to FIGS. 1 and 2, differing views of a rowing bicycle of the present invention are shown. The rowing bicycle has a frame 1, preferably made of a heavy metal material, a seat 5, a steering unit 55 and wheels 2 and 3. The steering unit 55 is comprised of a handlebar 4, hand grips 16, a handbrake 6, a gear shifter 9 and a rowing t-pipe 44.

The steering unit 55 has a rowing vertical bar 40 and rowing legs 42 attached to a center bar 19, which is located in the center of the frame 1. The center bar 19 has a front end 20 and a back end 33 and has a first and second pulley 12 and 13 located in between each end 20 and 33. A reverse chain cable 13 feeds under the first pulley 11 while a forward chain cable 24 feeds under the second pulley 13.

The front end of the center bar 20 has a center bar tab 37 attached to turning arms 17, which are connected to front crossbar tabs 57. The front crossbar tabs 57 are connected to a front crossbar 14 and the front wheels 3. Thus, when a user is steering, he or she pivots the steering unit 55 left or right about the center bar 19 to cause the front end of the center bar 20 to rotate left or right. When the front end of the center bar 20 rotates, the turning arm 17 pulls one front crossbar tab 57 and pushes the other front crossbar tab 57, which causes both front wheels 3 to turn.

The rowing bicycle has a rear wheel chain 7 which feeds through a gear shifting mechanism 10 located on the rear wheel 2. Gear plates 8 are provided on the rear wheel 2 to allow a user the option of traveling in a higher gear.

A rear wheel frame 50 provides protection for the rear wheel 2 and rear support bars 15 provide additional security for the rear wheel frame 50.

Figure 3:
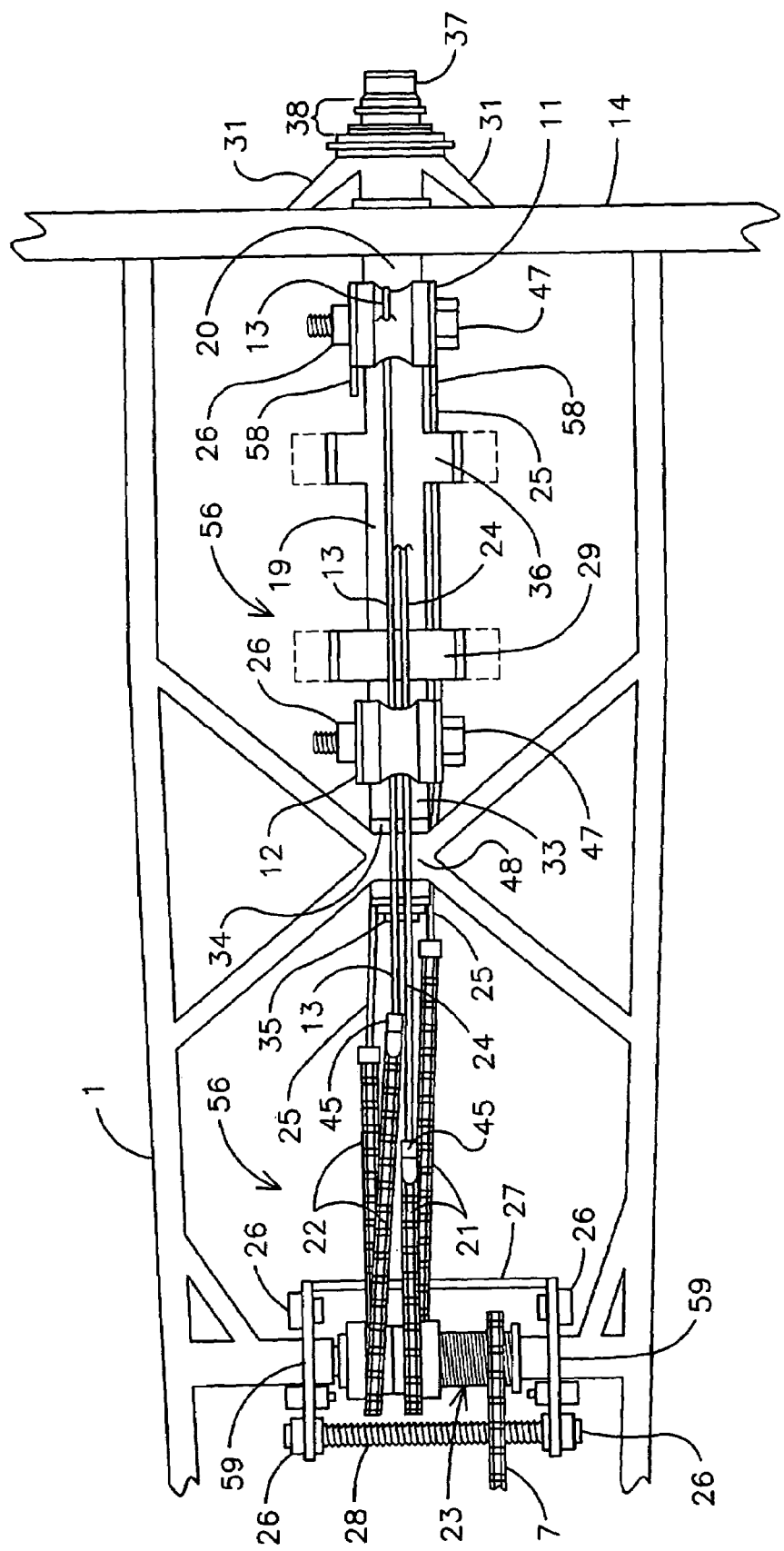
FIG. 3 is a top view of a powering unit of the present invention.

In FIG. 3, a top view of a powering unit 56 of the present invention is shown. The powering unit 56 comprises a first pulley 11 and a second pulley 12. The first pulley 11 is secured to the front end of the center bar 20, preferably by using a nut 47 and a bolt 26. The second pulley 12 is secured to a back end of the center bar 33, also preferably by using a nut 47 and bolt 26. The back end of the center bar 33 enters through an x-bar support 48 and is capped with an end cap 35 upon exit of the x-bar support 48. The center bar 19 has a first and second center bar t 29 and 36 wherein the steering unit 55 is attached. The front end of the center bar 20 has center bar front end supports 31 which connect the center bar 19 to the front crossbar 14. The center bar tab 37 and plates 38 are also located on the front end of the crossbar 20.

A dual motion gear 23 allows for a user to receive power both when pushing and pulling the steering unit 55. A rod 27, a threaded rod 28 and two housing sides 59 comprise a housing for the dual motion gear 23. The housing, which protects the dual motion gear 23, is affixed to the frame 1 by using bolts 26. The dual motion gear 23 also has a forward chain 21, a reverse chain 22 and a rear wheel chain 7 affixed thereon. The forward chain 21 has a forward chain cable 24 attached on one end and a connecting tube 25 attached on the other. The reverse chain 22 has a reverse chain cable 13 attached on one end and a connecting tube 25 attached on the other. The cables 24 and 13 are threaded through an end link in each respective chain 21 and 22 and the cables 24 and 13 are secured by using a clip 45. Each connecting tube 25 is anchored to the bicycle by using a connecting tube anchor 58 located near the first pulley 11. The connecting tube anchor 58 simply holds one end of the connecting tubes 25 fixedly while the forward and reverse chains 21 and 22 are in motion. The cables 24 and 13 are positioned so as to travel under the second pulley 12. The reverse chain cable 13 continues to towards the front of the center bar 20 to travel under the first pulley 11 and wrap upwards. The ends of the cables 13 and 24 are connected to parts of the steering unit 55, as shown in FIG. 5.

Figure 4:
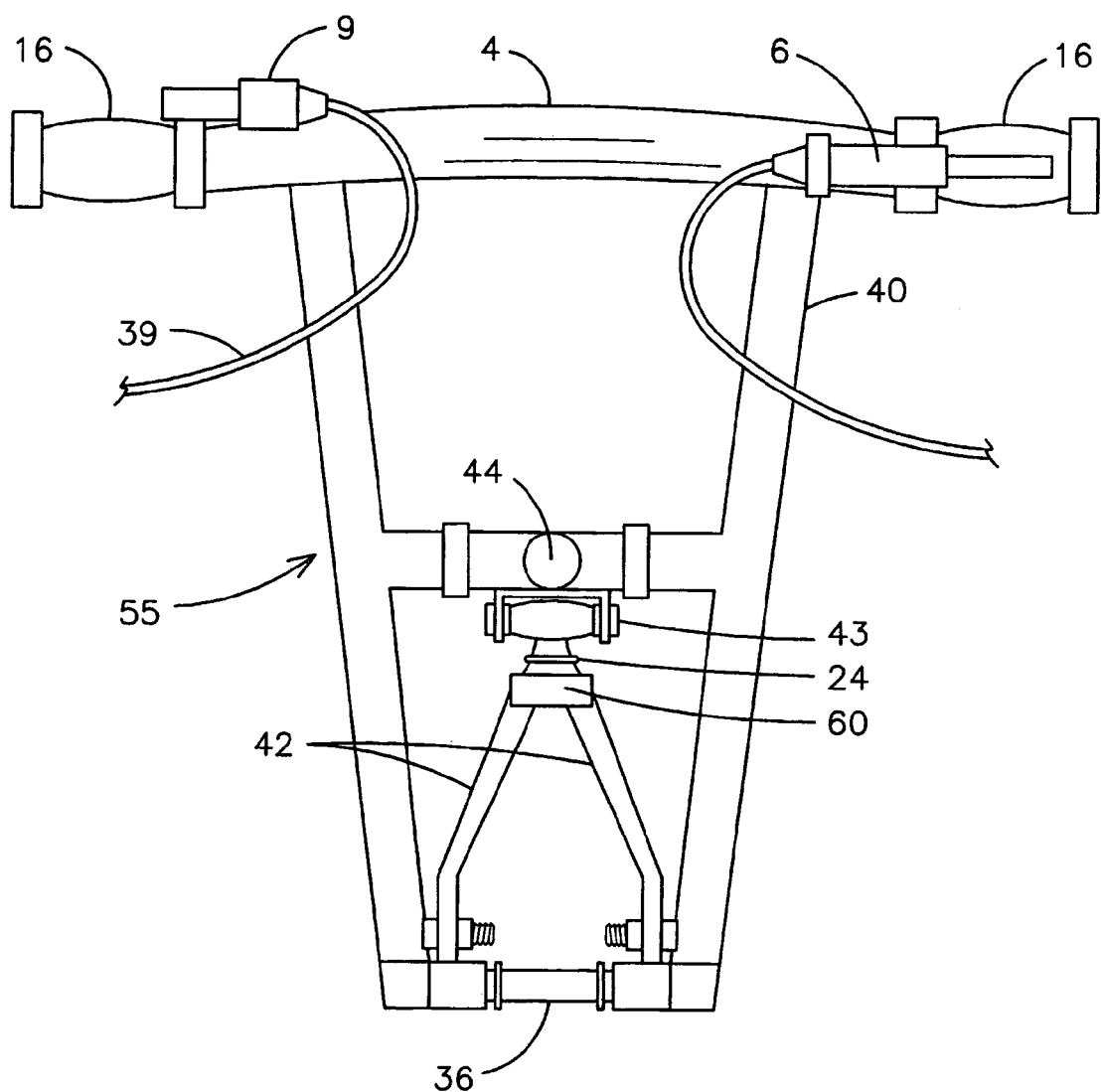
FIG. 4 is a front view of a steering unit of the present invention.
Figure 5:
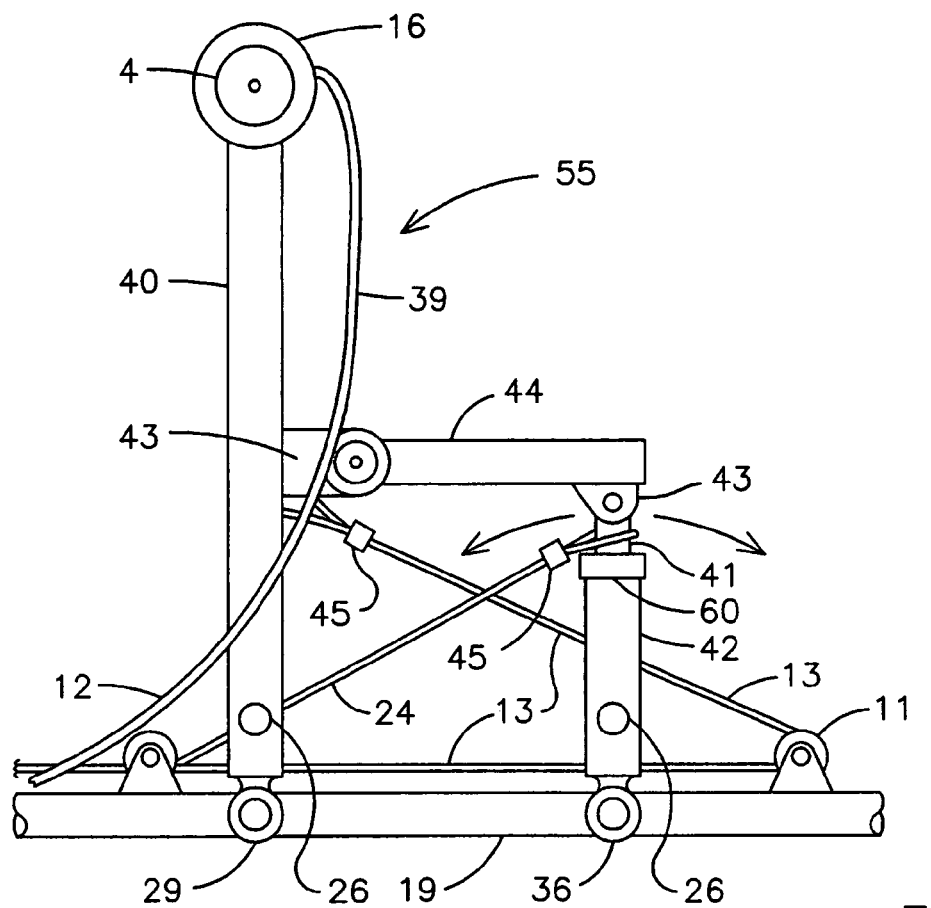
FIG. 5 is a side view of a steering unit of the present invention.

In FIGS. 4 and 5, differing views of a steering unit 55 of the present invention are shown. The steering unit 55 has a rowing vertical bar 40, two rowing legs 42, a rowing t-pipe 44 and a handlebar 4. Affixed to the handlebar are hand grips 16, a handbrake 6 and a gear shifter 9. A gear cable 39 is attached to the gear shifter 9 to allow a user to change the gears of the bicycle.

The rowing legs 42 are angled inward so as to connect to a cover 60. The cover 60 has a small pipe 41 attached thereon. The small pipe 41 has a head 61, which is affixed in between a rowing tab 43 on the rowing t-pipe 44. The base of the rowing vertical bar 40 and rowing legs 42 are fixedly attached to the first and second center bar Ts 29 and 36, respectively. The head 41 allows the rowing t-pipe 44 to pivotally move forward or back when a user pushes or pulls the steering unit 55, thus allowing the rowing legs 42 to move from about a forty-five degree angle to about a 135 degree angle.

The reverse chain cable 13 is wrapped around the rowing tab 43 joining the rowing vertical bar 40 and rowing t-pipe 44 and is secured by using a clip 45. The forward chain cable 24 is wrapped around the small pipe 41 and secured by using a clip 45.

Figure 6:
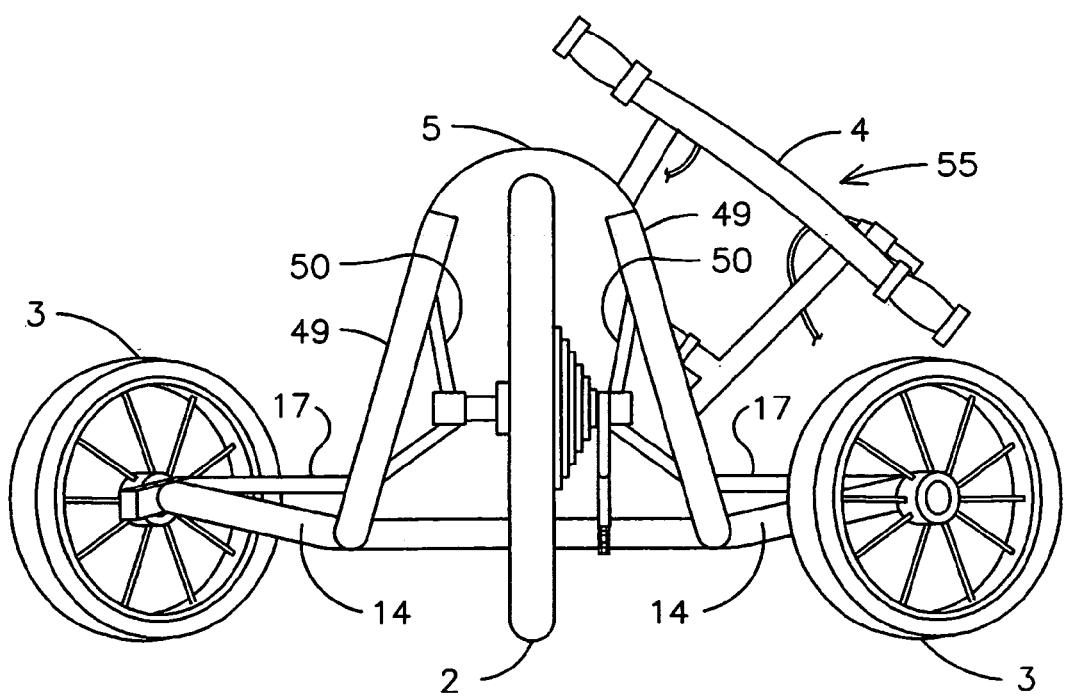
FIG. 6 is rear view of the embodiment of FIG. 1 with turned wheels.

In FIG. 6, a rear view of the embodiment of FIG. 1 with turned wheels 3 is shown. To turn the wheels 3, the user pivots the steering unit 55 to the left or right about the horizontal centerline of the bicycle. Because the steering unit 55 is fixedly connected to the center bar 19, when the steering unit 55 is pivoted, the turning arms 17 move to cause the front wheels 3 to turn. Thus, if a user desires to turn right, he or she simply pivots the steering unit 55 to the right (as currently shown). A rear wheel frame 50 holds the rear wheel 2 in place.

For comfort, a seat 5 having a raised back, which is supported by a seat frame 49, is provided. A user rests his or her feet on the front crossbar 14 when using the bicycle.

Figure 7:
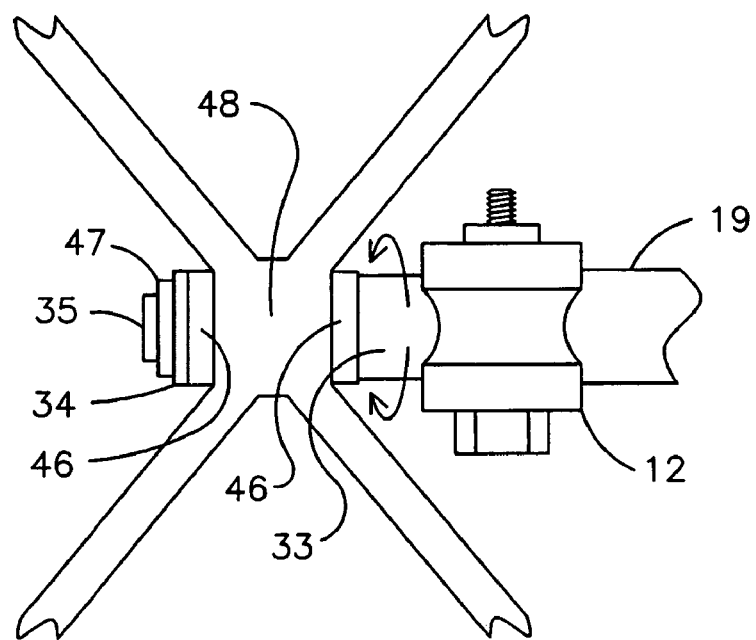
FIG. 7 is a top view of a back end of a center bar of the present invention.

FIG. 7 shows a top view of a back end of a center bar 33 of the present invention. The back end of the center bar 33 feeds through an x-bar support 48. Spacers 46 are provided on either side of the x-bar support 48. A washer 34, nut 47 and end cap 35 keep the center bar 19 from exiting the x-bar support 48. Directional arrows show the pivoting movement of the center bar 19.

Figure 8:
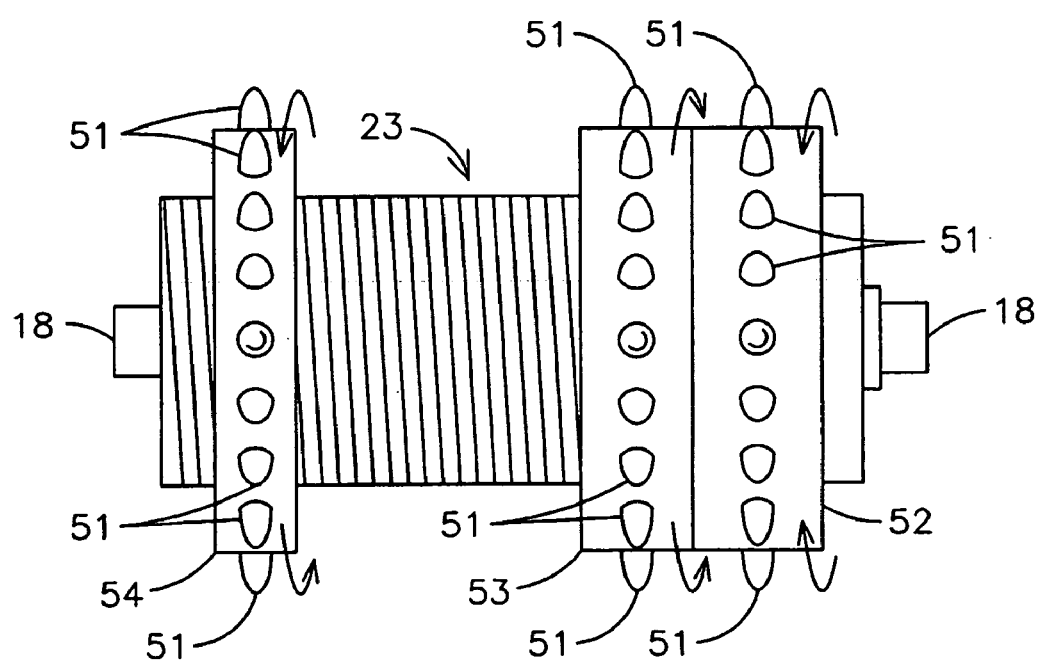
FIG. 8 is a side view of a dual motion gear of the present invention.

With reference to FIG. 8, a side view of a dual motion gear 23 of the present invention is shown. A rear wheel chain gear 54, a reverse chain gear 52 and a forward chain gear 53 work together to power the bicycle in a forward direction. The respective chains 7, 22 and 21 rest on the sprockets 51 of the gears 54, 52 and 53. Insertable ends 18 are located on either side of the dual motion gear 23 for insertion into the housing sides 59.

To use the rowing bicycle, a user simple seats himself or herself in the seat 5 and rests his or her feet on the front crossbar 14. Then, he or she pushes or pulls, depending in which position the steering unit 55 is at the time of seating, to power the rowing bicycle forward. To turn the bicycle, the user simply pivots the steering unit 55 to the left or right of the center bar 19 to turn the front wheels 3 in a corresponding direction. Because the bicycle is propelled forward by the rear wheel 2, turning of the front wheels 3 will not cause the bike to lose momentum. A gear shifter 9 and gear shifting mechanism 10 allows a person to change gears and travel at a higher speed. A handbrake 6 allows the user to stop when desired.

It is to be understood that while a certain form of the invention is illustrated, it is not to be limited to the specific form or arrangement of parts herein described and shown. It will be apparent to those skilled in the art that various changes may be made without departing from the scope of the invention and the invention is not be considered limited to what is shown and described in the specification and drawings.

Having thus described my invention, I claim:

1. A rowing bicycle comprising:
a frame of a predetermined size and shape;
at least two wheels attached to said frame;
a powering unit attached to said frame;
said powering unit having a dual motion gear;
said dual motion gear having a housing;
said housing comprising a pair of housing sides connected to the frame, with a rod and a threaded rod connected between the housing sides;
a means for connecting said dual motion gear to at least one wheel of said at least two wheels;
a steering unit attached to said frame; and
a means for connecting said steering unit to at least one wheel of said at least two wheels.

2. The rowing bicycle of claim 1 wherein: said frame is metal.

3. The rowing bicycle of claim 1 wherein: said steering unit pivots about a horizontal axis.

4. The rowing bicycle of claim 1 wherein; said steering unit has a handlebar; a handbrake is attached to said handlebar; and a gear shifter is attached to said handlebar.

5. The rowing bicycle of claim 3 wherein; said steering unit has a handlebar; a handbrake is attached to said handlebar; and a gear shifter is attached to said handlebar.

6. The rowing bicycle of claim 1 wherein; said means for connecting said dual motion gear to at least one wheel of said at least two wheels is via a forward chain; and said means for connecting said dual motion gear to at least one wheel of said at least two wheels is via a reverse chain.

7. The rowing bicycle of claim 6 wherein; said means for connecting said dual motion gear to at least one wheel of said at least two wheels is via a rear wheel chain.

8. The rowing bicycle of claim 1 wherein; a seat is attached to said frame.

9. The rowing bicycle of claim 3 wherein; said steering unit turns at least one wheel of said at least two wheels when pivoted.

10. The rowing bicycle of claim 1 wherein; said at least two wheels is a front wheel and a rear wheel.

11. The rowing bicycle of claim 9 wherein; said at least one wheel turned is a front wheel.

12. The rowing bicycle of claim 1 wherein; said powering unit has at least one pulley.

13. The rowing bicycle of claim 1 wherein; the steering unit moves forward when pushed; and the steering unit moves backward when pulled.

14. The rowing bicycle of claim 3 wherein; the steering unit moves forward when pushed; and the steering unit moves backward when pulled.

15. The rowing bicycle of claim 10 wherein; said rear wheel rotates forward when the steering unit is pushed forward; and said rear wheel rotates forward when the steering unit is pulled backward.

16. The rowing bicycle of claim 1 wherein; said means for connecting said steering unit to at least one wheel of said at least two wheels is via at least one front crossbar tab.

17. The rowing bicycle of claim 1 wherein; said housing has at least one side.

* * * * *